(12) United States Patent
Goertz et al.

(10) Patent No.: US 7,519,379 B2
(45) Date of Patent: Apr. 14, 2009

(54) MULTIMEDIA MESSAGE CENTER AND TELECOMMUNICATION DEVICE FOR ACCESSING STORED MULTIMEDIA MESSAGES

(76) Inventors: Werner Goertz, An der Seikenkapelle 19, 46282 Dorsten (DE); Marco Lang, Millinger Weg 21, 46395 Bocholt (DE); Stefan Nieder, Der Lege Weidendeich 8, 46419 Isselburg (DE); Albert Ratermann, Händelstr. 30, 46395 Bocholt (DE); Thomas Schulte, Am Wielbach 9B, 46399 Bocholt (DE); Marco van de Logt, Neu-Erscher-Weg 17, 47574 Goch (DE)

( * ) Notice: Subject to any disclaimer, the term of this patent is extended or adjusted under 35 U.S.C. 154(b) by 356 days.

(21) Appl. No.: 10/535,314

(22) PCT Filed: Dec. 19, 2003

(86) PCT No.: PCT/EP03/14639

§ 371 (c)(1),
(2), (4) Date: Jan. 10, 2006

(87) PCT Pub. No.: WO2004/057851

PCT Pub. Date: Jul. 8, 2004

(65) Prior Publication Data

US 2006/0109836 A1 May 25, 2006

(30) Foreign Application Priority Data

Dec. 19, 2002 (DE) ................ 102 59 753

(51) Int. Cl.
*H04M 11/00* (2006.01)
(52) U.S. Cl. ..................... 455/466; 455/406
(58) Field of Classification Search ............. 455/412, 455/466, 406
See application file for complete search history.

(56) References Cited

U.S. PATENT DOCUMENTS

| 4,612,416 | A | 9/1986 | Emerson et al. | |
|---|---|---|---|---|
| 7,200,680 | B2* | 4/2007 | Evans et al. | 709/246 |
| 2001/0053687 | A1* | 12/2001 | Sivula | 455/412 |

FOREIGN PATENT DOCUMENTS

EP    1014630    6/2006

OTHER PUBLICATIONS

"3rd Generation Partnership Project; Technical Specification Group Terminals, Multimedia Messaging Service (MMS) Functional description, Stage 2 (Release 4)", 3GPP TS 23, 140 V4..2.0, XX, XX Mar. 2001, pp. 1-73, XP002238091.

(Continued)

*Primary Examiner*—Creighton Smith
(74) *Attorney, Agent, or Firm*—Baker Botts L.L.P.

(57) ABSTRACT

A multimedia message service center and telecommunication device for accessing deposited multimedia messages. The forwarding and receipt of multimedia messages transmitted in networks that are configured for the Multimedia Messaging Service (MMS) independent of the communication between the networks and the infrastructure and the topology of the respective network from any transmitter to any addressee. A dial-in information (EWI) is indirectly or directly sent to the telecommunication device in addition to a communication message (MN) sent indirectly or directly e.g. via a short message center and/or an additional multimedia message center to the telecommunication device (ETKG) in response to a multimedia message (MMN) destined for a telecommunication device (ETKG) and deposited in the multimedia message center (MMNDZ). This dial-in information (EWI) tells the telecommunication device where to dial in to be able to access the multimedia message (MMN) addressed to the telecommunication device. The telecommunication device then accesses, in accordance with the dial information (EWI), the multimedia message service center (MMNDZ) or a depository (HLS) associated with the multimedia message service center (MMNDZ) and collects the multimedia message (MMN).

28 Claims, 4 Drawing Sheets

OTHER PUBLICATIONS

Forster M., "Multimedia Messaging Service", British Telecommunications Engineering, British Telecommunications Engineering, London, GB. vol. 1, No. 2, Jul. 2002, pp. 224-226, XP001162371.

"Universal Mobile Telecommunications System (UMTS); Multimedia Messaging Service (MMS), Functional Description, Stage 2 (3GPP TS 23.140 Version 4.2.0 Release 4)", ETSI TS 123 140 V4.2.0, XX, XX Mar. 2001, XP002180514.

"Access and Terminals (AT, Fixed Line Multimedia Messaging Service, PSTN/ISDN, Multimedia Message Communication between a fixed network Multimedia Messaging Terminal Equipment and a Multimedia Messaging Service Centre", DES/AT-0300023 V0.1.0 (Nov. 2003) ETSI Standard.

International Search Report; PCT/EP 03/14639; pp. 6.

* cited by examiner

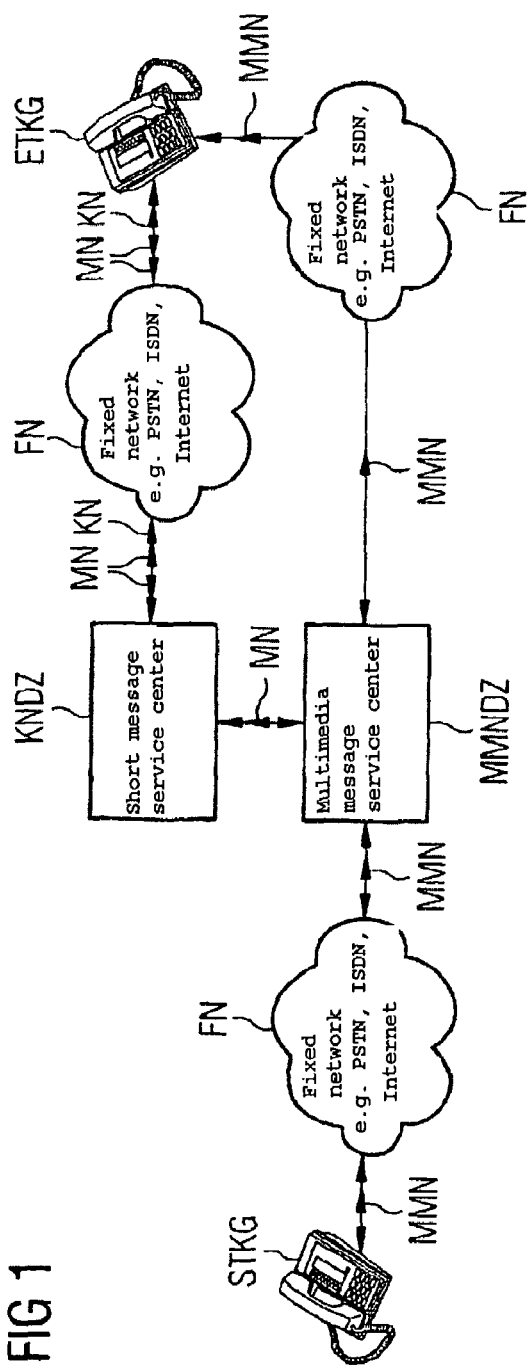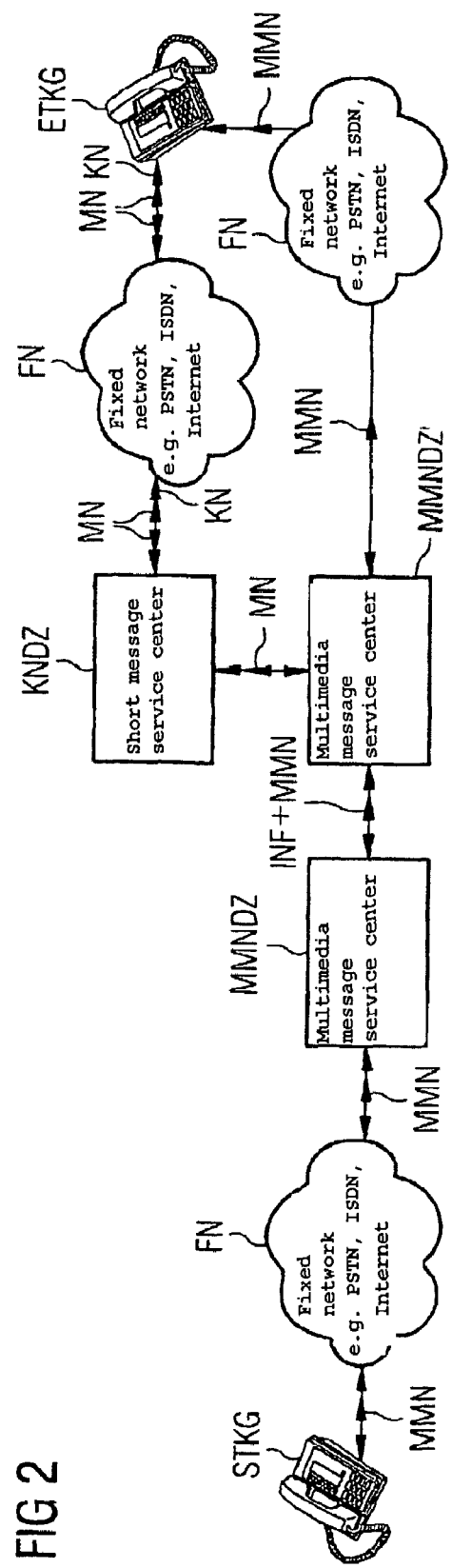

MULTIMEDIA MESSAGE CENTER AND TELECOMMUNICATION DEVICE FOR ACCESSING STORED MULTIMEDIA MESSAGES

FIELD OF TECHNOLOGY

The present disclosure relates to a method and multimedia message center for delivering a multimedia message to a telecommunication device configured as a multimedia message sync and telecommunication device for accessing multimedia messages stored in at least one storage unit of a multimedia message service center.

BACKGROUND

The transmission (i.e., sending and receiving) of service messages to and from a telecommunication device—such as a mobile telephone, a cordless telephone with a base station and at least one mobile unit, a fixed network telephone, a fax machine, a personal computer, etc.—is a communication service that is classified in relation to the information content transmitted with the messages, e.g. texts, multimedia content such as audio/video data (ring tones, screen savers), graphics, programs, etc. Because of the high level of acceptance, service messages have gradually become established in the fixed network area. Of the wide range of services offered in the mobile radio network—such as the Short Message (Messaging) Service (SMS), the Enhanced Message (Messaging) Service (EMS), the Multimedia Message (Messaging) Service (MMS), Instant Messaging, Over The Air Activation (OTA), email, etc.—the trend in the fixed network area is that SMS and MMS communication services will play a more major role. While the SMS service is already standardized both for the mobile radio area and for the fixed network area (for GSM: ETSI TS 100 942 V7.0.0, Release 1998; for ISDN/PSTN: ETSI ES 201 912 V1.1.1, Release January 2002), in the case of the MMS service the same only applies to the mobile radio area (see: 3GPP TS 22.140 V4.y.z; stage 1 and 2; release 4), while standardization activities are still ongoing at present in the fixed network area (see: ETSI DES/AT-030023 V0.1.0, November 2003).

The delivery of a multimedia message to a telecommunication device, whereby the multimedia message is transmitted to a multimedia message service center responsible for the delivery of the multimedia message to the telecommunication device and having an MMS relay/server and stored there and whereby the multimedia message service center sends a notification message, known as the multimedia message notification, to the telecommunication device, informing said telecommunication device of the stored message, is known from the publication 3GPP TS 23.140 V4.2.0, XX, XX, March 2001 (2001-03), pages 1 to 73, XP-002238091: "$3^{rd}$ Generation Partnership Project; Technical Specification Group Terminals; Multimedia Messaging Service (MMS); Functional description; stage 2 (release 4).

The SMS service in the fixed and mobile networks is a point-to-point service, characterized by a pure push functionality—i.e. the content of the short message (SM), the length of which is maximum 160 bytes, is send by the short message service center (SMSC) to the telecommunication device and generally comprises text data—where establishment of the connection is typically prompted by the service center. While an SMS service in the mobile radio area operates in a connectionless manner between the telecommunication device and the short message service center (i.e., the short message is transmitted via a signaling channel without a traffic channel connection being setup), in the fixed network the SMS service operates in a connection-oriented manner (i.e., a traffic channel connection is established between the telecommunication device and the short message service center and the short message is transmitted using the service feature Calling Line Identification (CLI), referred to as Calling Line Identification Presentation (CLIP), by means of FSK and/or DTMF signaling (Frequency Shift Keying or Dual Tone Multiple Frequency).

In the case of an MMS service, which operates in the mobile radio network like the SMS service in a connectionless manner via a WAP transport path (use of the Wireless Application Protocol), in the fixed network another mechanism is brought to bear:

When a multimedia message (MM) is sent, the size of which is currently restricted to approx. 100 kBytes, and which could contain text, multimedia content such as audio/video data (ring tones, screen savers), graphics, programs, etc., in short text, audio and/or video data, a notification message known as the MMS notification is first sent to the telecommunication device, again in a connection-oriented manner, informing the telecommunication device that a multimedia message is present at the multimedia message service center (MMSC). This takes place by means of a push service, e.g. the SMS service. It is then necessary, unlike when receiving a short message, to initiate the setting up of a further connection from the telecommunication device to the multimedia message service center to receive the content of the multimedia message.

FIGS. 1 and 2 show this situation—the transmission of multimedia messages MM in the fixed network from a sender (send device) to a addressee (receive device), each of the devices generally only being registered with a single multimedia message service center MMSC, according to the prior art.

FIG. 1 illustrates a transmission of a multimedia message (MM) MMN in the fixed network FN from a send telecommunication device STKG to a receive telecommunication device ETKG, both devices being registered with one and the same multimedia message service center (MMSC) MMNDZ, which is assigned to the fixed network FN. "Assigned" here means that the multimedia message service center MMNDZ is either a component of the fixed network FN or is arranged outside the fixed network FN. The send telecommunication device STKG or receive telecommunication device ETKG is registered with the multimedia message service center MMNDZ by programming a receive and send number for the service center into the respective device. This is either done by preconfiguring the respective telecommunication device in the factory or by manual configuration by the user of the device or by a specific configuration message, which is transmitted once during installation of the MMS service, e.g. via the SMS service from the multimedia message service center MMNDZ to the send telecommunication device STKG or the receive telecommunication device ETKG and is loaded dynamically with the data required for the installation of the MMS service.

Transmission of the multimedia message MMN starts with the send telecommunication device STKG sending the multimedia message MMN intended for the receive telecommunication device ETKG via the fixed network FN to the multimedia message service center MMNDZ. In order to inform the receive telecommunication device ETKG that the multimedia message MMN, intended for the receive telecommunication device ETKG, has arrived in the multimedia message service center MMNDZ, the multimedia message service center MMNDZ sends a notification message MN to a short message service center (SMSC) KNDZ that is assigned to the fixed network FN as the carrier of information for the receive telecommunication device like the multimedia message service center MMNDZ. The short message service center KNDZ inserts the receive notification message MN into a short message (SM) KN and sends this short message KN with the incorporated notification message MN in the known manner via the fixed network FN to the receive telecommunication device ETKG. However, this requires the receive telecommunication device ETKG to be registered with the short message service center KNDZ. Registration with the short message service center KNDZ takes place in the same way as registration with the multimedia message service center MMNDZ.

Upon receipt of the notification message MN, the receive telecommunication device ETKG sets up a temporary telecommunication connection via the fixed network FN or a temporary Internet connection according to the TCP/IP protocol to the multimedia message service center MMNDZ, with which it is registered as mentioned above, in order to collect the multimedia message MMN stored there.

The fact that the receive telecommunication device ETKG—as already determined above—is generally only registered with a single multimedia message service center and short message service center respectively, means that the connection for collecting the multimedia message MMN can only be set up with the multimedia message center stored in each instance in the telecommunication device.

The multimedia message itself does not necessarily always have to be located on a data server (storage unit) of the multimedia message service center, with which the telecommunication device collecting the multimedia message is registered, but it can be located anywhere else on any data server, for example a data server of another multimedia message service center. This occurs whenever the send telecommunication device STKG is registered with another multimedia message service center as the sender of the multimedia message MMN, which is shown in FIG. 2.

Like FIG. 1, FIG. 2 shows the transmission of a multimedia message (MM) MMN in the fixed network FN from a send telecommunication device STKG to a receive telecommunication device ETKG, with, unlike in FIG. 1, both devices being registered with different multimedia message service centers (MMSC) MMNDZ, MMNDZ', both of which are assigned to the fixed network. While the send telecommunication device STKG is registered with the multimedia message service center MMNDZ as in FIG. 1, the receive telecommunication service center ETKG is registered with a further multimedia message service center MMNDZ'.

"Assigned" here means that the multimedia message service center MMNDZ, MMNDZ' is either a component of the fixed network FN or is arranged outside the fixed network FN. The send telecommunication device STKG or receive telecommunication device ETKG is registered with the multimedia message service center MMNDZ or the further multimedia message service center MMNDZ' by programming a receive and send number for the service center into the respective device. This is either done by preconfiguring the respective telecommunication device in the factory or by manual configuration by the user of the device or by a specific configuration message, which is transmitted once during installation of the MMS service, e.g. via the SMS service from the multimedia message service center MMNDZ to the send telecommunication device STKG or from the further multimedia message service center MMNDZ' to the receive telecommunication device ETKG and is loaded dynamically with the data required for the installation of the MMS service.

Transmission of the multimedia message MMN again starts with the send telecommunication device STKG sending the multimedia message MMN intended for the receive telecommunication device ETKG via the fixed network FN to the multimedia message service center MMNDZ. However, the multimedia message service center MMNDZ identifies that the addressed receive telecommunication device ETKG is not registered with it but with the further multimedia message service center MMNDZ'. It therefore sends information INF with the associated multimedia message MMN to the further multimedia message service center MMNDZ'. The further multimedia message service center MMNDZ' receives this information and message, and subsequently sends a notification message MN, to inform the receive telecommunication device ETKG that it has received the multimedia message MMN intended for the receive telecommunication device ETKG from the multimedia message service center MMNDZ, to a short message service center (SMSC) KNDZ, that is assigned to the fixed network FN as the carrier of the information for the receive telecommunication device ETKG again like the two multimedia message service centers MMNDZ, MMNDZ'. The short message service center KNDZ again inserts the received notification message MN into a short message (SM) KN and sends this short message KN with the incorporated notification message MN in the known manner via the fixed network FN to the receive telecommunication device ETKG, which is again registered for this purpose with the short message service center KNDZ. Registration with the short message service center KNDZ takes place in the same way as registration with the further multimedia message service center MMNDZ'.

Upon receipt of the notification message MN, the receive telecommunication device ETKG sets up a temporary telecommunication connection via the fixed network FN or a temporary Internet connection using a TCP/IP protocol to the further multimedia message service center MMNDZ', with which it is registered as mentioned above, in order to collect the multimedia message MMN received and stored there for collection.

FIG. 2 illustrates that the two multimedia message service centers have their own mechanisms to transmit the multimedia message from one service center to the other service center. As the fixed network operators of such service centers are often in competition with each other or are perhaps even in a different country, there are frequently no corresponding bilateral agreements between the operators so that in such a case it might not be possible to transmit the multimedia message at all.

In the mobile radio area this problem is typically resolved by pre-arranging agreements between the individual operators of multimedia service centers.

The competitive situation mentioned above currently exists in Germany regarding SMS services, in the fixed network area. To resolve these kinds of problems, the numbers of a plurality of short message service centers are stored in the telecommunication devices so that it is possible to receive short messages, even from [lacuna] at unlogged short message service centers. Receipt of a short message is generally not a problem, as the setting up of the connection is always prompted by the supplying short message service center.

BRIEF SUMMARY

An exemplary embodiment discloses a method and a multimedia message center for delivering a multimedia message to a telecommunication device configured as a multimedia message sync and a telecommunication device for accessing multimedia messages stored in at least one storage unit of a multimedia message service center, with which the multimedia messages transmitted in networks designed for the multimedia message service (MMS) can be delivered from any sender to any addressee and be received by said addressee regardless of the communication between the networks and the infrastructure and topology of the respective network.

Under the embodiment, dial-in information is sent to the telecommunication device directly or indirectly—e.g. via a short message center and/or a further multimedia message center—in addition to a notification message sent to the telecommunication device from a multimedia message center directly or indirectly—e.g. via a short message center and/or a further multimedia message center—based on a multimedia message stored in the multimedia message center and intended for a telecommunication device. This dial-in information informs the telecommunication device where it must dial in to, in order to be able to access the multimedia message intended for the telecommunication device. The telecommunication device then accesses the multimedia message service center or a storage unit assigned to the multimedia message service center according to the dial-in information, in order to collect the multimedia message.

This has the following advantages:

(i) If the user is in another country, the dial-in number can also be a number in that country of the multimedia message service center available there. The dial-in number would then be a national number and this would save the user the charges for an international call.

(ii) The multimedia message can remain with the sender's multimedia message service center until it is collected directly from there. This reduces the network load.

(iii) The use of a dial-in number allows the user of a multimedia message service center to control utilization of the multimedia message service center, e.g. by means of an optional or alternative portal number.

(iv) The use of a dial-in number means that it is still possible, as before, to collect the multimedia message from the users "own" multimedia message service center.

(v) An agreement between the individual operators of multimedia message service centers is not required. Only an agreement to transmit the notification message is required instead. This is the case in particular when the SMS service is used for transmission, as the SMS service has already been introduced in most countries.

It is preferable for the dial-in number to be embedded in the structure of a notification message already provided—according to the standard for the transmission of multimedia messages in the fixed network. This is done by extending the notification message or so-called MMS notification to include an additional MMS information element, e.g. an X-MMS-Dial-In. This contains a unique identifier of the multimedia message service center according to the guidelines proposed by 3GPP in the MMS standard [email addresses (RFC 822) or multiple subscriber ISDN (E.164)]. The information element is optional, i.e. the user of the multimedia message service center can decide whether or not it is inserted into the MMS notification. The use of the dial-in numbers used is also optional, i.e. the multimedia message can be collected conventionally [see: advantage mentioned above (iv)]. This is essential in order not to impair the function of existing systems.

It is also preferable if the dial-in number in the telecommunication device is verified for unwanted effects such as spam (unsolicited data) or 0190 numbers, by using a security protocol in the device (ad hoc log-on), using an exclusion list with excluded dial-in information, an authorization list with authorized dial-in information or a special list with generally applicable rules for permitted dial-in information or implementing a user-defined control system.

DESCRIPTION OF THE DRAWINGS

The various objects, advantages and novel features of the present disclosure will be more readily apprehended from the following Detailed Description when read in conjunction with the enclosed drawings, in which:

FIG. 1 shows the transmission of multimedia messages in the fixed network from a sender (send device) to an addressee (receive device), when both devices are registered with the same multimedia message service center.

FIG. 2 shows the transmission of multimedia messages in the fixed network from a sender (send device) to an addressee (receive device), when both devices are registered with different multimedia message service centers.

DETAILED DESCRIPTION

Figure 3:
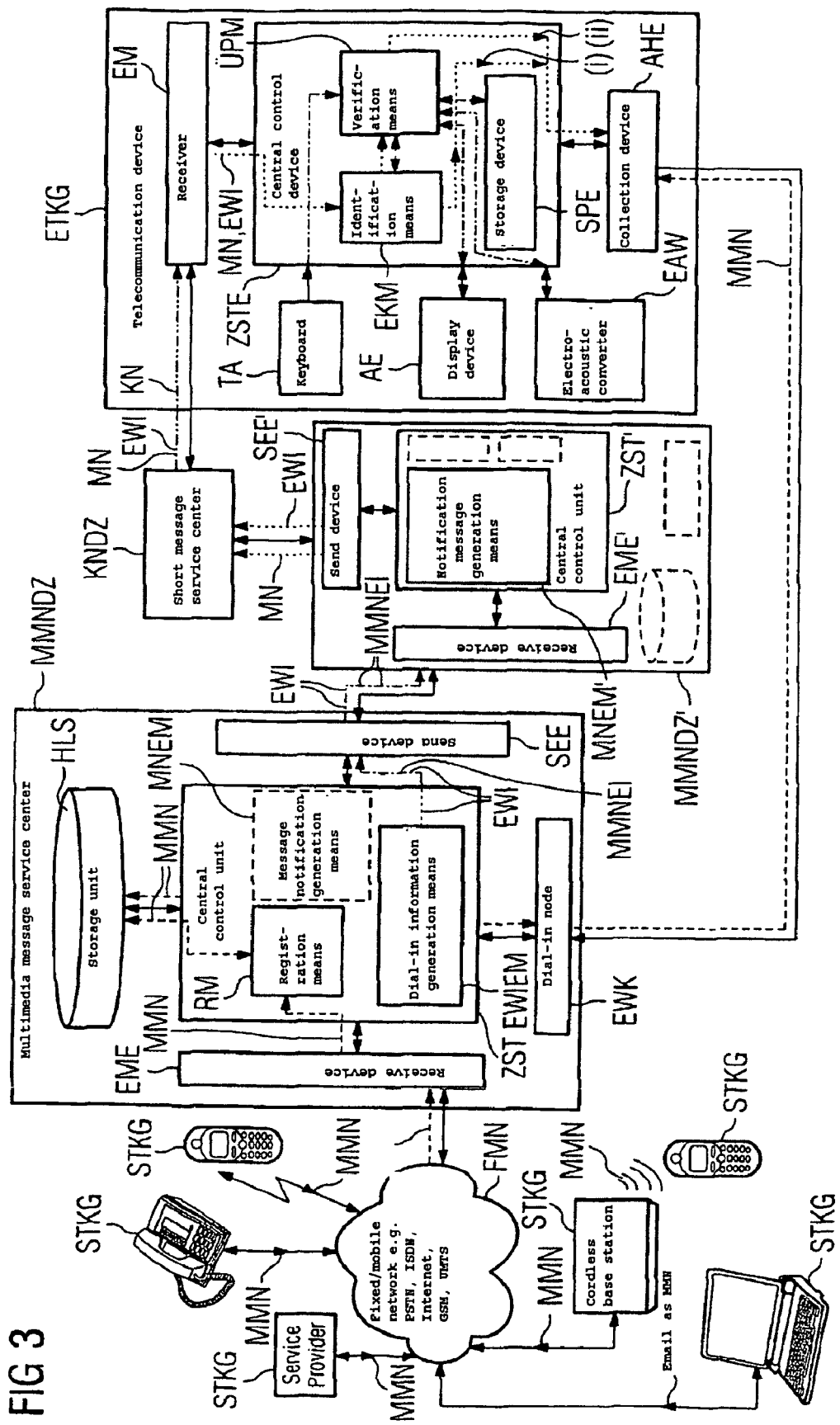
FIG. 3 illustrates a transmission of multimedia messages in the fixed/mobile network from a sender (send device) to an addressee (receive device), when both devices are registered with different multimedia message service centers, involving both service centers, message storage unit and dial-in node of the collection multimedia message service center being integrated therein under an exemplary embodiment.

FIG. 3 illustrates a transmission scenario based on FIG. 2 with the transmission of a multimedia message (MM) MMN in a fixed/mobile network FMN from a send telecommunication device STKG to a receive telecommunication device ETKG, whereby both devices are registered with different multimedia message service centers (MMSC) MMNDZ, MMNDZ', both assigned to the fixed/mobile network FMN. While the send telecommunication device STKG is registered with a multimedia message service center MMNDZ, as in FIGS. 1 and 2, the receive telecommunication device ETKG is registered with a multimedia message service center MMNDZ' as in FIG. 2.

Under the embodiments described herein, the term "assigned" means that the multimedia message service center (MMNDZ, MMNDZ') is either a component of the fixed/mobile network FMN or is arranged outside the fixed/mobile network FMN. The send telecommunication device STKG or receive telecommunication device ETKG is registered with the multimedia message service center MMNDZ or the further multimedia message service center MMNDZ' by programming a receive and send number for the service center into the respective device. This is either done by preconfiguring the respective telecommunication device in the factory or by manual configuration by the user of the device or by a specific configuration message, which is transmitted once during installation of the MMS service, e.g. via the SMS service from the multimedia message service center MMNDZ to the send telecommunication device STKG or from the further multimedia message service center MMNDZ' to the receive telecommunication device ETKG and is loaded dynamically with the data required for the installation of the MMS service.

The send telecommunication device STKG can be configured differently according to the illustration in FIG. 3, for example as a cordless telephone, a GSM/UMTS mobile telephone, a DECT cordless telephone comprising a cordless base station and at least one cordless mobile unit, a portable personal computer (notebook) or a service provider. This list is not exclusive but can be extended to include any such devices that are also able to send multimedia messages MMN via the fixed/mobile network FMN to the receive telecommunication device ETKG. The form in which the multimedia message MMN is sent is less important. It is therefore possible for example to send an email as a multimedia message MMN in addition to the known send forms.

Transmission of a multimedia message MMN starts with send telecommunication device STKG sending multimedia message MMN, intended for the receive telecommunication device ETKG via the fixed/mobile network FMN, to multimedia message service center MMNDZ. The multimedia message service center MMNDZ has a receive device EME for receiving the multimedia message MMN sent by the send telecommunication device STKG. The receive device EME forwards the received multimedia message MMN to central control unit ZST of the multimedia message service center MMNDZ, which controls the operational and functional processes in the multimedia message service center MMNDZ. Registration means RM, preferably configured as software, are contained in this central control unit ZST, which register the forwarded multimedia message MMN and forward it for temporary buffering to a storage unit HLS connected to the central control unit ZST and integrated in the multimedia message service center MMNDZ.

The central control unit ZST of the multimedia message service center MMNDZ, using the forwarded multimedia message MMN, verifies whether or not the addressed receive telecommunication device ETKG is registered with the multimedia message service center MMNDZ. In the example shown in FIG. 3, the central control unit ZST establishes that the addressed receive telecommunication device ETKG is not registered with it, but with a further multimedia message service center MMNDZ'. This verification is preferably also undertaken by the registration means RM.

Upon registration and storage of multimedia message MMN, the receive telecommunication device ETKG is informed by the central control unit ZST of the multimedia message service center MMNDZ that a multimedia message intended for the receive telecommunication device ETKG is stored for collection in the multimedia message service center MMNDZ. To this end, in addition to the registration means RM, the central control unit ZST also has means, preferably also configured as software, to generate dial-in information EWIEM. The dial-in information generation means EWIEM generate dial-in information EWI, informing the receive telecommunication device ETKG where it must dial in to, in order to be able to access and collect the stored multimedia message MMN. The central control unit ZST of the multimedia message service center MMNDZ also contains notification message generation means MNEM, and are shown with a broken line.

As the receive telecommunication device ETKG is not registered with the multimedia message service center the aforementioned notification of where the receive telecommunication device ETKG must dial in to, in order to be able to access and collect the stored multimedia message, cannot take place directly from the multimedia message service center MMNDZ without support. In the scenario shown in FIG. 3 the further multimedia message service center MMNDZ', which is connected for this purpose to the multimedia message service center MMNDZ inside or outside the fixed/mobile network FMN, is able to do this. In order to inform the multimedia message service center MMNDZ' of the multimedia message MMN intended for the receive telecommunication device ETKG that has arrived and is stored at the multimedia message service center MMNDZ, multimedia message arrival information MMNEI is generated in the central control unit ZST and the dial-in information EWI is inserted therein.

The multimedia message arrival information MMNEI, extended to include the dial-in information EWI, is forwarded by the central control unit ZST to a send device SEE in the multimedia message service center MMNDZ and sent from there to the further multimedia message service center MMNDZ'.

The further multimedia message service center MMNDZ', which corresponds in structure to the multimedia message service center MMNDZ, has a further receive device EME' and a further send device SEE', both of which are connected to a further central control unit ZST', which contains further notification message generation means MNEM'. The other devices, such as the storage unit and the dial-in node, and the other means assigned to the central control unit ZST', such as the registration means and the dial-in information generation means, are shown with a broken line in FIG. 3.

The further receive device EME' receives the multimedia message arrival information MMNEI extended to include the dial-in information EWI and forwards this to the further central control unit ZST'. The central control unit ZST' analyzes this information, identifies that a multimedia message intended and stored for the receive telecommunication device ETKG has arrived at the multimedia message service center MMNDZ and separates the transmitted dial-in information EWI. The further notification message generation means MNEM' in the central control unit ZST' also generate a notification message MN, the MMS notification introduced on implementation of the MMS service in the fixed network, to inform the receive telecommunication device ETKG of the presence of a multimedia message intended for the receive telecommunication device ETKG.

Both the notification message MN and the separated dial-in information EWI are forwarded to the further send device SEE' to inform the receive telecommunication device ETKG of the presence of a multimedia message intended for the receive telecommunication device ETKG.

This forwarding operation may be such that the notification message MN and the dial-in information are forwarded either separately or together in the form of a single message.

The latter of these two alternatives is preferred, as it reduces transmission cost in the multimedia message service center MMNDZ' and also establishes common forwarding by embedding the dial-in information EWI in the notification message MN without any problem in an existing message structure predefined by a standard for the notification message MN or the MMS notification.

Incorporation into the message structure is preferably effected by extending the notification message MN, the so-called MMS notification to include an additional MMS information element, e.g. an X-MMS-Dial-In, which is available for dial-in information.

The notification message MN and dial-in information EWI forwarded to the send device SEE' are transmitted by the latter to the receive telecommunication device ETKG. This transmission can take place directly from the further multimedia message service center MMNDZ' or indirectly, i.e. via at least one further entity. For direct transmission of the notification message MN and dial-in information EWI, regardless of whether or not the receive telecommunication device ETKG is registered with the further multimedia message service center MMNDZ', a corresponding transmission protocol must be defined and specified between the multimedia message service center MMNDZ' and the receive telecommunication device ETKG, so that the receive telecommunication device ETKG can identify the transmitted message and information as such and interpret them.

Indirect transmission, whereby a transmission service is generally used for transmission of the notification message MN and dial-in information EWI, is also disclosed herein. As already explained in the description of FIGS. 1 and 2, this is the short message or SMS service with an SMS-specific transmission protocol. With the SMS service, transmission of the message and information to be transmitted to the telecommunication device is effected by a corresponding short message service center irrespective of whether or not the receive telecommunication device ETKG is registered with the multimedia message service center MMNDZ'. Other services are also possible for the said purpose.

The SMS service is used again, as in FIGS. 1 and 2, for transmission of the notification message MN and dial-in information in FIG. 3. Therefore the further send device SEE' sends the notification message MN and the dial-in information EWI to a short message service center (SMSC) KNDZ, which is assigned again to the fixed/mobile network FMN as the carrier of information for the receive telecommunication device ETKG, again like the two multimedia message service centers MMNDZ, MMNDZ'. The short message service center KNDZ inserts the received notification message MN and dial-in information EWI into a short message (SM) KN configured as a short message service message and sends this short message KN with the incorporated notification message MN and dial-in information EWI in the known manner via the fixed/mobile network FMN to the receive telecommunication device ETKG connected to the short message service center KNDZ, with which it is again registered for this purpose. Registration with the short message service center KNDZ takes place in the same manner as registration of the receive telecommunication device ETKG with the further multimedia message service center MMNDZ' or registration of the send telecommunication device STKG with the multimedia message service center MMNDZ.

Instead of incorporating the notification message MN and dial-in information EWI directly in the short message KN, it is also possible as an alternative for the notification message MN and dial-in information EWI to be incorporated indirectly in the short message KN, by first incorporating it in a wireless application protocol push message and then incorporating the wireless application protocol push message in the short message KN.

So that the notification message MN and dial-in information EWI can be received by the receive telecommunication device ETKG, this latter has a receiver EM, which is connected to a central control device ZSTE, which controls the operational and functional processes in the receive telecommunication device ETKG. The notification message MN and dial-in information ultimately pass via this connection into the central control device ZSTE.

The central control device ZSTE contains identification means EKM, preferably configured as software, which identify the received dial-in information EWI forwarded to the central control device ZSTE. Once the dial-in information EWI has been identified and the central control device ZSTE knows which multimedia message service center the receive telecommunication center ETKG must dial in to, in order to be able to access and collect the stored multimedia message MMN, the receive telecommunication device ETKG sets up a temporary telecommunication connection according to the dial-in information via the fixed/mobile network FMN or a temporary Internet connection according to the TCP/IP protocol to the multimedia message service center corresponding to the dial-in information, the multimedia message service center MMNDZ, in order to collect the multimedia message MMN that has arrived there and is stored there for collection. The dial-in information EWI is preferably a telephone number or alternately a uniform resource locator (URL) to specify an address in the World Wide Web (Internet). The dial-in information EWI can alternatively also contain other comparable location data or information.

For collection in this manner, the receive telecommunication device ETKG has a collection device AHE for collecting messages and/or information, connected to the central control device ZSTE and for the temporary telecommunication connection or Internet connection to a dial-in node EWK of the multimedia message service center MMNDZ, so that the central control device ZSTE can access the multimedia message service center MMNDZ using the identified dial-in information EWI according to the control path (i) in FIG. 3 via the collection device AHE and collect the multimedia message.

The dial-in node EWK of the multimedia message service center MMNDZ is connected to the central control unit ZST and from the point of view of the multimedia message service center MMNDZ forms the interface or gateway to the receive telecommunication device ETKG, via which the receive telecommunication device ETKG requests collection and the multimedia message MMN is output as prompted by the central control unit ZST.

To protect the user of the receive telecommunication device ETKG against unwanted effects, such as spam (unsolicited data), 0190 numbers, etc., the central control device ZSTE contains verification means ÜPM, preferably also configured as software. The verification means ÜPM and the identification means EKM form a functional unit such that after identification of the dial-in information EWI, the dial-in information EWI is verified before the central control device ZSTE can access the multimedia message service center MMNDZ according to the control path (ii) in FIG. 3 as a function of this verification.

Verification by the verification means ÜPM preferably takes place according to an exclusion list with excluded dial-in information, an authorization list with authorized dial-in information or a special list with generally applicable rules for permitted dial-in information. To this end, the central control device ZSTE has a storage device SPE, in which the lists are stored. Alternatively the storage device SPE can also be a separate device, which is connected to the central control device ZSTE.

Another option for verification by the verification means ÜPM is a user-defined controller. To this end the central control device ZSTE is connected to a keyboard TA, electro-acoustic converters EAW and a display device AE. A dialog takes place with the user of the telecommunication device via these devices or components of the telecommunication device, such that the dial-in information EWI is displayed acoustically or visually to the user and the user must then confirm the displayed dial-in information EWI. Confirmation can preferably take place by keyboard or soft-key input or even by voice input.

Another option is to use a security protocol (ad hoc log-on) in the device.

Figure 4:
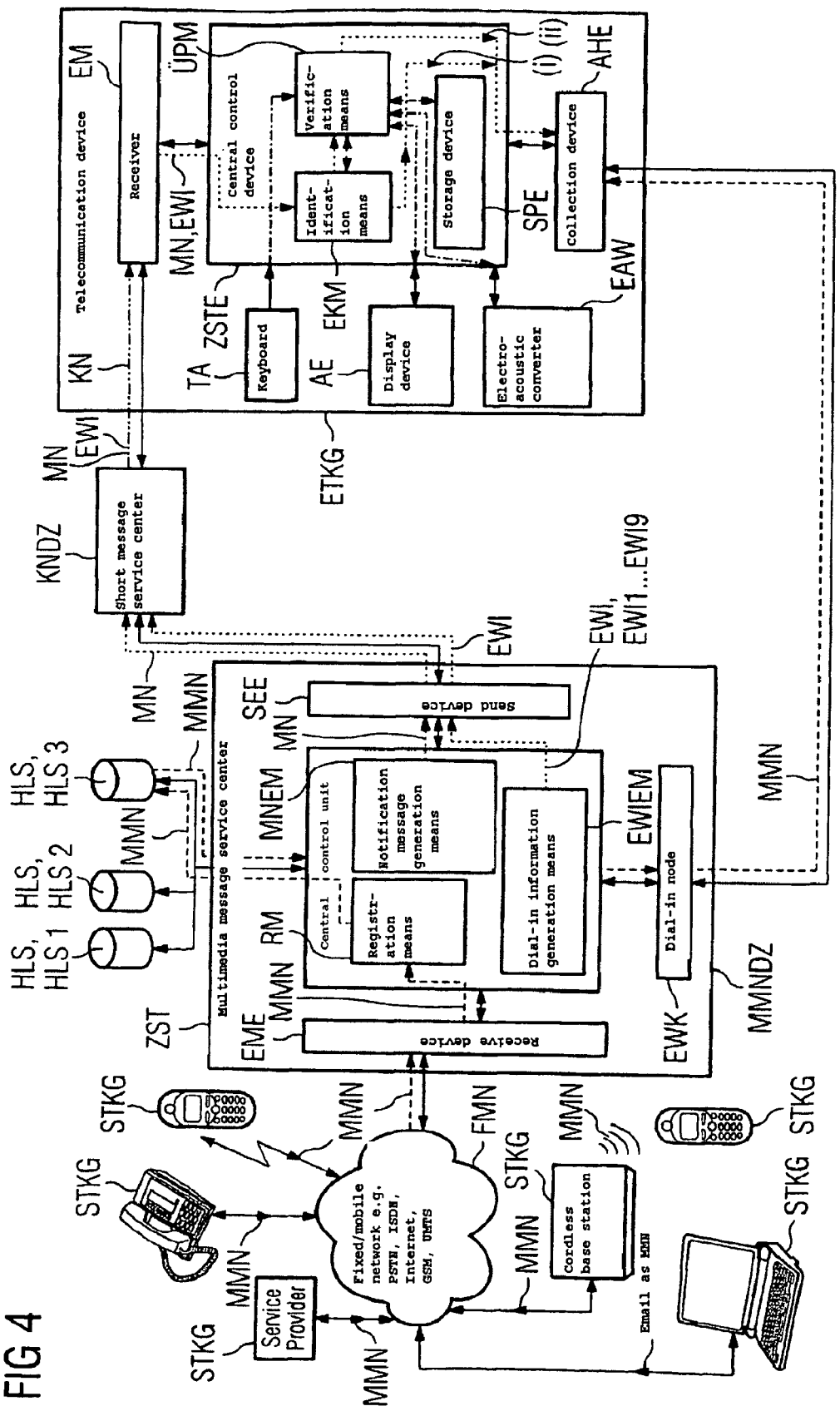
FIG. 4 illustrates a transmission of multimedia messages in the fixed/mobile network from a sender (send device) to an addressee (receive device), when both devices are registered either with the same multimedia message service center or with different multimedia message service centers, involving only the collection multimedia message service center, the message storage unit being arranged outside and the dial-in node being arranged inside the collection multimedia message service center under an alternate embodiment.

FIG. 4 illustrates a second transmission scenario with the transmission of a multimedia message (MM) MMN in a fixed/mobile network FMN from a send telecommunication device STKG to a receive telecommunication device ETKG, both devices being registered either with different multimedia message service centers MMNDZ, MMNDZ' as in the scenario in FIG. 3 or with one and the same multimedia message service center MMNDZ, e.g. the multimedia message service center MMNDZ or the further multimedia message service center MMNDZ'. The multimedia message service center or multimedia message service centers is/are again assigned to the fixed/mobile network FMN. While the send telecommunication device STKG is registered with the multimedia message service center MMNDZ as in FIGS. 1 and 2, the receive telecommunication center ETKG can now be registered with the further multimedia message service center MMNDZ' as in FIG. 3 or with the multimedia message service center MMNDZ like the send telecommunication device STKG according to the diagram in FIG. 4.

As mentioned previously, "assigned" in respect of the fixed/mobile network FMN means that the multimedia message service center MMNDZ is either a component of the fixed/mobile network FMN or is arranged outside the fixed/mobile network FMN. The send telecommunication device STKG or receive telecommunication device ETKG is again registered with the multimedia message service center MMNDZ by programming a receive and send number for the service center into the respective device. This is again done by preconfiguring the respective telecommunication device in the factory or by manual configuration by the user of the device or by a specific configuration message, which is transmitted once during installation of the MMS service, e.g. via the SMS service from the multimedia message service center MMNDZ to the send telecommunication device STKG and to the receive telecommunication device ETKG and is loaded dynamically with the data required for the installation of the MMS service.

The send telecommunication device can again be configured differently as in FIG. 3, for example as a cordless telephone, a GSM/UMTS mobile telephone, a DECT cordless telephone comprising a cordless base station and at least one cordless mobile unit, a portable personal computer (notebook) or a service provider. This list is not exclusive but can be extended to include any such devices which are also able to send multimedia messages MMN via the fixed/mobile network FMN to the receive telecommunication device ETKG. The form in which the multimedia message MMN is sent is less important. It is therefore possible for example to send an email as a multimedia message MMN in addition to the known send forms.

Transmission of the multimedia message MMN starts with the send telecommunication device STKG sending the multimedia message MMN intended for the receive telecommunication device ETKG via the fixed/mobile network FMN to the multimedia message service center MMNDZ. The multimedia message service center MMNDZ again has a receive device EME for receiving the multimedia message MMN sent by the send telecommunication device STKG. The receive device EME forwards the received multimedia message MMN again to a central control unit ZST of the multimedia message service center MMNDZ, which controls the operational and functional processes in the multimedia message service center MMNDZ. Registration means RM, preferably configured as software, are again contained in this central control unit ZST, which register the forwarded multimedia message MMN and forward it for temporary buffering to one of a plurality of storage unit HLS connected to the central control unit ZST and arranged outside the multimedia message service center MMNDZ.

Upon registration and storage of the multimedia message MMN, the receive telecommunication device ETKG is informed by the central control unit ZST of the multimedia message service center MMNDZ that a multimedia message intended for the receive telecommunication device ETKG is stored for collection in the multimedia message service center MMNDZ. To this end, in addition to the registration means RM, the central control unit ZST has means, preferably also configured as software, to generate notification messages MNEM and means to generate dial-in information EWIEM. The notification message generation means MNEM generate a notification message MN, the MMS notification introduced on implementation of the MMS service in the fixed network, to inform the receive telecommunication device ETKG of the presence of a multimedia message intended for the receive telecommunication device ETKG, while the dial-in information generation means EWIEM generate dial-in information, informing the receive telecommunication device ETKG where it must dial in to, in order to be able to access and collect the stored multimedia message MMN.

Both the notification message MN and the dial-in information EWI are forwarded for this purpose by the central control unit ZST to a send device SEE in the multimedia message service center MMNDZ. This forwarding operation may be such that the notification message MN and the dial-in information are forwarded either separately or together in the form of a single message.

This forwarding operation may be such that the notification message MN and the dial-in information EWI are forwarded either separately or together in the form of a single message.

The latter of these two alternatives is preferable, as it reduces transmission cost in the multimedia message service center MMNDZ and also incorporates common forwarding by embedding the dial-in information EWI in the notification message MN without any problem in an existing message structure predefined by a standard for the notification message MN or the MMS notification.

Incorporation in the message structure is preferably effected by extending the notification message MN, the so-called MMS notification to include an additional MMS information element, e.g. an X-MMS-Dial-In, which is available for dial-in information.

The notification message MN and dial-in information EWI forwarded to the send device SEE are transmitted by the latter to the receive telecommunication device ETKG. This transmission can take place directly from the multimedia message service center MMNDZ or indirectly, i.e. via at least one further entity. For direct transmission of the notification message MN and dial-in information EWI, regardless of whether or not the receive telecommunication device ETKG is registered with the multimedia message service center MMNDZ, a corresponding transmission protocol must be defined and specified between the multimedia message service center MMNDZ and the receive telecommunication device ETKG, so that the receive telecommunication device ETKG can identify the transmitted message and information as such and interpret them.

Indirect transmission, whereby a transmission service is generally used for transmission of the notification message MN and dial-in information EWI, is also disclosed herein. As already explained in the description of FIGS. 1 and 2, this is a short message or SMS service with an SMS-specific transmission protocol. With the SMS service, transmission of the message and information to be transmitted to the telecommunication device is effected by a corresponding short message service center irrespective of whether or not the receive telecommunication device ETKG is registered with the multimedia message service center MMNDZ. Other services are also possible for the said purpose.

The SMS service is used again as in FIGS. 1 to 3 for transmission of the notification message MN and dial-in information EWI in FIG. 4. Therefore the further send device SEE sends the notification message MN and the dial-in information EWI to a short message service center (SMSC) KNDZ, which is again assigned to the fixed/mobile network FMN as the carrier of information for the receive telecommunication device ETKG, like the multimedia message service center MMNDZ. The short message service center KNDZ inserts the received notification message MN and dial-in information EWI into a short message (SM) KN configured as a short message service message and sends this short message KN with the incorporated notification message MN and dial-in information EWI in the known manner via the fixed/mobile network FMN to the receive telecommunication device ETKG connected to the short message service center KNDZ, with which it is again registered for this purpose. Registration with the short message service center KNDZ takes place in the same manner as registration of the receive telecommunication device ETKG and the send telecommunication device STKG with the multimedia message service center MMNDZ.

Instead of incorporating the notification message MN and dial-in information EWI directly in the short message KN, it is also possible as an alternative for the notification message MN and dial-in information EWI to be incorporated indirectly in the short message KN, by first incorporating it in a wireless application protocol push message and then incorporating the wireless application protocol push message in the short message KN.

So that the notification message MN and dial-in information EWI can be received by the receive telecommunication device ETKG, the latter has a receiver EM, which is connected to a central control device ZSTE, which again controls the operational and functional processes in the receive telecommunication device ETKG. The notification message MN and dial-in information ultimately pass via this connection into the central control device ZSTE.

The central control device ZSTE contains identification means EKM, preferably configured as software, which identify the received dial-in information EWI forwarded to the central control device ZSTE. Once the dial-in information EWI has been identified and the central control device ZSTE therefore knows which multimedia message service center the receive telecommunication center ETKG must dial in to, in order to be able to access and collect the stored multimedia message MMN, the receive telecommunication device ETKG again sets up a temporary telecommunication connection according to the dial-in information EWI via the fixed/mobile network FMN or a temporary Internet connection according to the TCP/IP protocol to the multimedia message service center corresponding to the dial-in information, the multimedia message service center MMNDZ, in order to collect the multimedia message MMN that has arrived and is stored there for collection. The dial-in information EWI is again preferably a telephone number or may alternately be a uniform resource locator (URL) to specify an address in the World Wide Web (Internet). The dial-in information EWI can again alternatively also contain other comparable location data or information.

For collection in this manner the receive telecommunication device ETKG has a collection device AHE for collecting messages and/or information, connected to the central control device ZSTE and for the temporary telecommunication connection or Internet connection to a dial-in node EWK of the multimedia message service center MMNDZ, so that the central control device ZSTE can access the multimedia message service center MMNDZ using the identified dial-in information EWI according to the control path (i) in FIG. 4 via the collection device AHE and collect the multimedia message.

The dial-in node EWK of the multimedia message service center MMNDZ is connected to the central control unit ZST and from the point of view of the multimedia message service center MMNDZ forms the interface or gateway to the receive telecommunication device ETKG, via which the receive telecommunication device ETKG requests collection and the multimedia message MMN is output as prompted by the central control unit ZST.

Because the multimedia message MMN with the dial-in information EWI can be collected by the receive telecommunication device ETKG from the multimedia message service center MMNDZ and the central control unit ZST of the multimedia message service center MMNDZ is connected both to the dial-in node EWK and the individual storage units HLS, the operator of the multimedia message service center MMNDZ is able to control utilization of the storage units HLS in light of temporary buffering (storage) of multimedia messages using the dial-in information EWI generated in the multimedia message service center MMNDZ.

An alternate control scenario is one where the central control unit ZST stores multimedia messages at a first storage unit HLS1 and later collects them from there for first to third dial-in information EWI1 . . . EWI3, stores multimedia messages at a second storage unit HLS2 and later collects them from there for fourth to sixth dial-in information EWI4 . . . EWI6 and stores multimedia messages at a third storage unit HLS3 and later collects them from there for seventh to ninth dial-in information EWI7 . . . EWI9. Under this configuration the dial-in node EWK must accept all nine items of dial-in information and cannot reject them.

It is evident that the proposed control scenario can be modified in any manner and can be extended in any manner in respect of the number of storage units and items of dial-in information.

To protect the user of the receive telecommunication device ETKG against unwanted effects, such as spam (unsolicited data), 0190 numbers, etc., the central control device ZSTE again contains verification means ÜPM, preferably also configured as software. The verification means ÜPM and the identification means EKM again form a functional unit such that after identification of the dial-in information EWI, the dial-in information EWI is verified before the central control device ZSTE can access the multimedia message service center MMNDZ according to the control path (ii) in FIG. 4 as a function of this verification.

Verification by the verification means ÜPM preferably takes place according to an exclusion list with excluded dial-in information, an authorization list with authorized dial-in information or a special list with generally applicable rules for permitted dial-in information. To this end, the central control device ZSTE again has a storage device SPE, in which the lists are stored. Alternatively the storage device SPE can also be a separate device, which is connected to the central control device ZSTE.

Another option for verification by the verification means ÜPM is again a user-defined controller. To this end the central control device ZSTE is connected to a keyboard TA, electro-acoustic converters EAW and a display device AE. A dialog again takes place with the user of the telecommunication device via these devices or components of the telecommunication device, such that the dial-in information EWI is displayed acoustically or visually to the user and the user must then confirm the displayed dial-in information EWI. Confirmation can preferably take place by keyboard or soft-key input or even by voice input.

Another option is to use a security protocol (ad hoc log-on) in the device.

Figure 5:
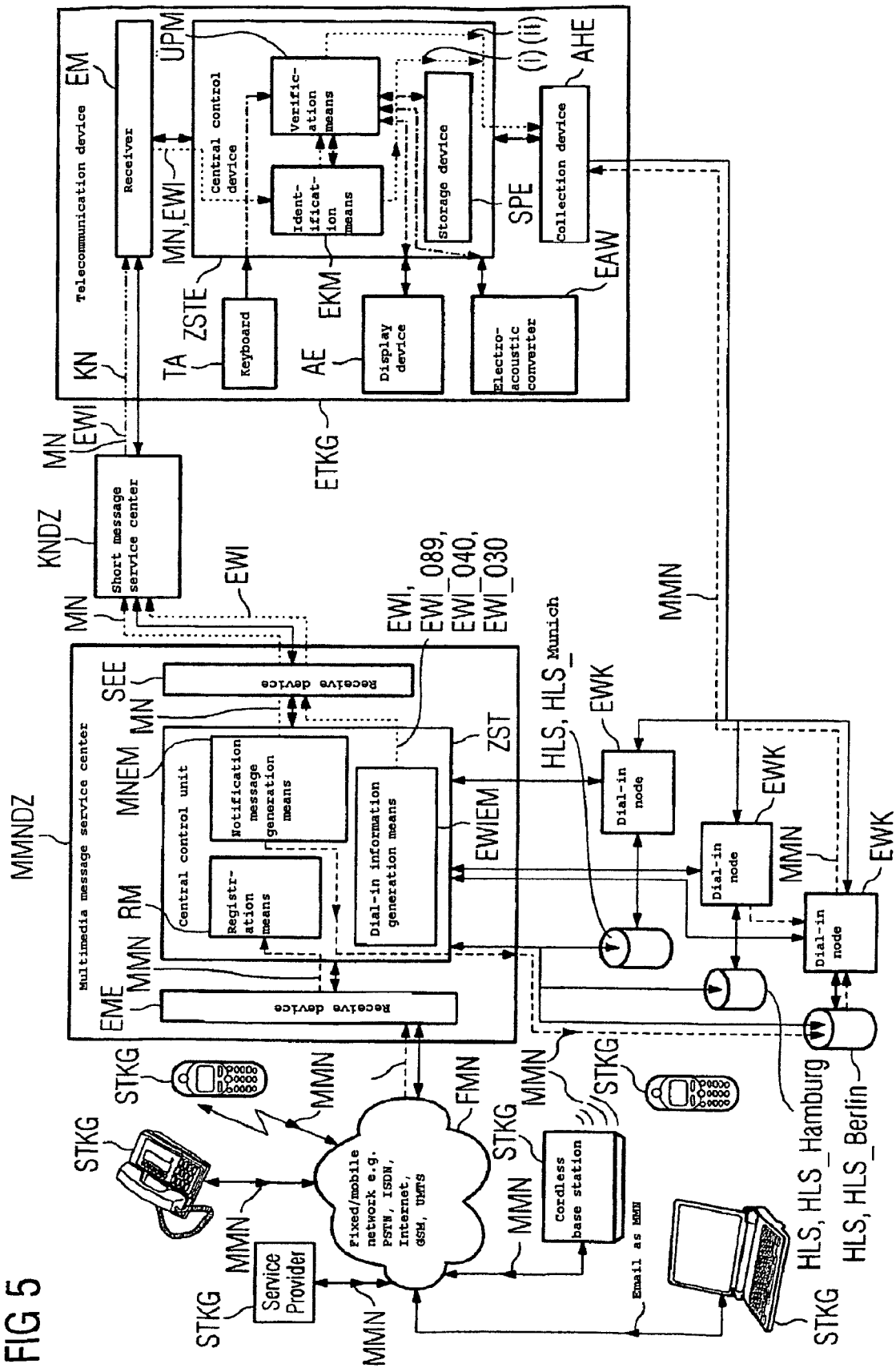
FIG. 5 illustrates a transmission of multimedia messages in the fixed/mobile network from a sender (send device) to an addressee (receive device), when both devices are registered either with the same multimedia message service center or with different multimedia message service centers, involving only the collection multimedia message service center, the message storage unit and the dial-in node being arranged outside the collection multimedia message service center under another alternate embodiment.

FIG. 5 shows a third transmission scenario with the transmission of a multimedia message (MM) MMN in a fixed/mobile network FMN from a send telecommunication device STKG to a receive telecommunication device ETKG, both devices being registered either with different multimedia message service centers (MMSC) MMNDZ, MMNDZ' as in the scenario in FIG. 3 or with one and the same multimedia message service center MMNDZ, e.g. the multimedia message service center MMNDZ or the further multimedia message service center MMNDZ'. The multimedia message service center or multimedia message service centers are again assigned to the fixed/mobile network FMN. While the send telecommunication device STKG is registered with the multimedia message service center MMNDZ as in FIGS. 1 and 2, the receive telecommunication center ETKG can now be registered with the further multimedia message service center MMNDZ' as in FIG. 3 or with the multimedia message service center MMNDZ like the send telecommunication device STKG according to the diagram in FIGS. 4 and 5.

The third transmission scenario shown in FIG. 5 differs from the second transmission scenario shown in FIG. 4 in that a dial-in node EWK is assigned to each storage unit HLS, each dial-in node EWK is connected to the central control unit ZST and the dial-in nodes EWK, like the storage units HLS, are arranged outside the multimedia message service center MMNDZ. For this reason, no further description of FIG. 5 is needed. The descriptions below therefore only relate to the specified differences between FIGS. 4 and 5.

To collect [lacuna] at the multimedia message service center MMNDZ, the receive telecommunication device ETKG again has the collection device AHE for collecting messages and/or information, connected to the central control device ZSTE of the receive telecommunication device ETKG and for the temporary telecommunication connection or Internet connection, to each dial-in node EWK of the multimedia message service center MMNDZ, so that the central control device ZSTE can access the multimedia message service center MMNDZ using the identified dial-in information EWI according to the control path (i) in FIG. 5 via the collection device and collect the multimedia message.

Each dial-in node EWK of the multimedia message service center MMNDZ is connected, as mentioned above, to the central control unit ZST and from the point of view of the multimedia message service center MMNDZ forms an interface or gateway respectively to the receive telecommunication device ETKG, via which the receive telecommunication device ETKG requests collection and the multimedia message MMN is output as prompted by the central control unit ZST.

Unlike the scenario in FIG. 4, with the scenario according to FIG. 5 it is also possible with a corresponding configuration of the respective dial-in node for both the request for collection and the outputting of the multimedia message to be processed without intervention by the central control unit ZST (no prompting by the central control unit ZST), regardless of this, solely by the respective dial-in node EWK. This means that the receive telecommunication device ETKG uses the dial-in information EWI to collect the multimedia message MMN not from the multimedia message service center MMNDZ but directly from the storage unit HLS assigned to the multimedia message service center MMNDZ.

Because the multimedia message MMN with the dial-in information EWI can be collected by the receive telecommunication device ETKG from the multimedia message service center MMNDZS, or from the storage unit assigned to the multimedia message service center MMNDZ and the central control unit ZST of the multimedia message service center MMNDZ is connected both to the dial-in node EWK and the individual storage units HLS, the operator of the multimedia message service center MMNDZ is able to control utilization of the storage units HLS in light of the temporary buffering (storage) of multimedia messages using the dial-in information EWI generated in the multimedia message service center MMNDZ.

An alternate control scenario is one where the central control unit ZST stores multimedia messages at a first storage unit HLS_Munich for first dial-in information EWI_089, stores multimedia messages at a second storage unit HLS_Hamburg for second dial-in information EWI_040 and stores multimedia messages at a third storage unit HLS_Berlin for third dial-in information EWI_030 and must then however determine that the first storage unit HLS_Munich is utilized to the maximum and cannot therefore take any new multimedia messages. Because the dial-in information is assigned in the multimedia message service center MMNDZ, the operator of the multimedia message service center MMNDZ is now able to respond flexibly to this situation. For multimedia messages which the operator would normally store at the first storage unit HLS_Munich but cannot now do because of the maximum utilization of the first storage unit HLS_Munich, the operator can now change to another storage unit, e.g. the third storage unit HLS_Berlin, because this is not yet fully utilized. The operator therefore assigns the third dial-in information EWI_030 for these multimedia messages instead of the first dial-in information EWI_089. It is evident that the proposed control scenario can on the one hand be changed in any manner and on the other hand can be extended in any manner in respect of the number of storage units and dial-in information elements.

The above described description and drawings are only to be considered illustrative of exemplary embodiments, which achieve the features and advantages of the invention. Modifications and substitutions to specific process conditions and structures can be made without departing from the spirit and scope of the invention. Accordingly, the invention is not to be considered as being limited by the foregoing description and drawings, but is only limited by the scope of the appended claims.

The invention claimed is:

1. A method for delivering a multimedia message to a telecommunication device configured as a multimedia message sync, comprising:

transmitting the multimedia message to a multimedia message service center, configured as a multimedia message source for the delivery of the multimedia message to the telecommunication device;

storing the multimedia message;

sending from the multimedia message service center a notification message directly or indirectly to the telecommunication device, to inform the telecommunication device of the stored multimedia message;

sending dial-in information from the multimedia message service center directly or indirectly to the telecommunication device, informing the telecommunication device where it must dial in to, in order to be able to access the stored multimedia message; and accessing the multimedia message service center or a storage unit assigned to the multimedia message service center from the telecommunication device according to the dial-in information, in order to collect the multimedia message, wherein the notification message is inserted into a wireless application protocol push message and the wireless application protocol push message is inserted into a short message configured as a short message service message, the short message being sent on the instruction of the multimedia message service center from a short message service center to the telecommunication device.

2. The method according to claim 1, wherein the multimedia message service center controls utilization of the storage unit in respect of storage of multimedia messages using the dial-in information.

3. The method according to claim 1, wherein access to the multimedia message service center or the storage unit assigned to the multimedia message service center takes place according to the dial-in information via a dial-in node.

4. The method according to claim 1, wherein access to the multimedia message service center or the storage unit assigned to the multimedia message service center takes place via a telecommunication connection or via an Internet connection according to the TCP/IP protocol.

5. The method according to claim 1, wherein in that in the multimedia message, the notification message and the dial-in information are transmitted via a fixed network or a mobile network.

6. The method according to claim 1, wherein audio, video and/or text data is transmitted with the multimedia message.

7. A method for delivering a multimedia message to a telecommunication device configured as a multimedia message sync, comprising:

transmitting the multimedia message to a multimedia message service center, configured as a multimedia message source for the delivery of the multimedia message to the telecommunication device;

storing the multimedia message;

sending from the multimedia message service center a notification message directly or indirectly to the telecommunication device, to inform the telecommunication device of the stored multimedia message;

sending dial-in information from the multimedia message service center directly or indirectly to the telecommunication device, informing the telecommunication device where it must dial in to, in order to be able to access the stored multimedia message; and accessing the multimedia message service center or a storage unit assigned to the multimedia message service center from the telecommunication device according to the dial-in information, in order to collect the multimedia message, wherein the multimedia message service center transmits information about the multimedia message stored in the multimedia message service center to a further multimedia message service center, the further multimedia message service center sending the notification message and the dial-in information directly or indirectly to the telecommunication device on the basis of the transmitted information.

8. A method for delivering a multimedia message to a telecommunication device configured as a multimedia message sync, comprising:

transmitting the multimedia message to a multimedia message service center, configured as a multimedia message source for the delivery of the multimedia message to the telecommunication device;

storing the multimedia message;

sending from the multimedia message service center a notification message directly or indirectly to the telecommunication device, to inform the telecommunication device of the stored multimedia message;

sending dial-in information from the multimedia message service center directly or indirectly to the telecommunication device, informing the telecommunication device where it must dial in to, in order to be able to access the stored multimedia message; and accessing the multimedia message service center or a storage unit assigned to the multimedia message service center from the telecommunication device according to the dial-in information, in order to collect the multimedia message, wherein upon receipt of the dial-in information sent by the multimedia message service center, the telecommunication terminal verifies the dial-in information before access takes place as a function of said verification.

9. The method according to claim 8, wherein the dial-in information is verified automatically on the basis of an exclusion list with excluded dial-in information, an authorization list with authorized dial-in information or a special list with generally applicable rules for permitted dial-in information.

10. The method according to claim 8, wherein the dial-in information is verified in dialog with the user of the telecommunication device such that the dial-in information is displayed acoustically or visually to the user and said user must then confirm the displayed dial-in information before access takes place.

11. A multimedia message service center for delivering a multimedia message to a telecommunication device configured as a multimedia message sync, comprising:

a central control unit that controls an operational and functional processes in the multimedia message service center;

means for generating notification messages assigned to the central control unit, which generate a notification message relating to the multimedia message that has arrived in the central control unit;

means for generating dial-in information assigned to the central control unit to inform the telecommunication device where it must dial in to, in order to be able to access the stored multimedia message;

a send device (SEE) for sending notification messages, wherein the send device sends the dial-in information received via a connection to the central control unit in addition to the notification message directly or indirectly to the telecommunication device, so that the telecommunication device can access the multimedia message service center or the storage unit assigned to the multimedia message service center according to the dial-in information, to collect the multimedia message, wherein the notification message is inserted into a wireless application protocol push message and the wireless application protocol push message is inserted into a short message configured as a short message service message and the multimedia message service center is connected to a short message service center, so that on the instruction of the multimedia message service center the short message is sent from a short message service center to the telecommunication device.

12. The multimedia message service center according to claim 11, wherein the central control unit is configured such that utilization of the storage unit in respect of storage of the multimedia messages can be controlled using the dial-in information.

13. The multimedia message service center according to claim 11, wherein the central control unit and at least one storage unit are assigned a common dial-in node or a respective common dial-in node, via which the telecommunication device accesses the multimedia message service center or the storage unit assigned to the multimedia message service center according to the dial-in information.

14. The multimedia message service center according to claim 11, wherein the multimedia message service center or the storage unit assigned to the multimedia message service center is connected via a telecommunication connection or Internet connection according to the TCP/IP protocol to the telecommunication device.

15. The multimedia message service center according to claim 11, wherein the multimedia message service center is assigned to the fixed network or the mobile network.

16. The multimedia message service center according to claim 11, wherein the multimedia message has audio, video and/or text data.

17. A multimedia message service center for delivering a multimedia message to a telecommunication device configured as a multimedia message sync, comprising:

a central control unit that controls an operational and functional processes in the multimedia message service center;

means for generating notification messages assigned to the central control unit, which venerate a notification message relating to the multimedia message that has arrived in the central control unit;

means for generating dial-in information assigned to the central control unit to inform the telecommunication device where it must dial in to, in order to be able to access the stored multimedia message;

a send device (SEE) for sending notification messages, wherein the send device sends the dial-in information received via a connection to the central control unit in addition to the notification message directly or indirectly to the telecommunication device, so that the telecommunication device can access the multimedia message service center or the storage unit assigned to the multimedia message service center according to the dial-in information, to collect the multimedia message, wherein the send device and the central control unit are configured such that information about the multimedia message and the dial-in information are transmitted to a further multimedia message service center, the further multimedia message service center sending the notification message and the dial-in information directly or indirectly to the telecommunication device on the basis of the transmitted information.

18. A telecommunication device for accessing multimedia messages stored in at least one storage unit of a multimedia message service center, comprising:

a central control device for controlling the operational and functional processes in the telecommunication device; a collection device for collecting messages and/or information, which is connected to the central control device;

a receiver for receiving a notification message sent directly or indirectly from the multimedia message service center to the telecommunication device, which is connected to the central control device and forwards the notification message to the central control device to inform the telecommunication device of a multimedia message stored in the multimedia message service center for the telecommunication device;

identification means assigned to the central control device which is configured such that dial-in information received by the receiver in addition to the notification message and forwarded to the central control device is identified, informing the telecommunication device where it must dial in to, in order to be able to access the stored multimedia message, wherein the collection device and the central control device with the assigned identification means are configured such that the central control device accesses the multimedia message service center or the storage unit assigned to the multimedia message service center via the collection device using the dial-in information, to collect the multimedia message, wherein the telecommunication device can be connected directly or indirectly to a further multimedia message service center, which sends the notification message and dial-in information directly or indirectly to the telecommunication terminal on the instruction of the multimedia message service center, in which the multimedia message is stored.

19. The telecommunication device according to claim 18, wherein the dial-in information is inserted into the notification message.

20. The telecommunication device according to claim 18, wherein the notification message is inserted into a short message configured as a short message service message and the telecommunication device is connected to a short message service center, which sends the short message to the telecommunication device on the instruction of the multimedia message service center.

21. The telecommunication device according to claim 18, wherein the notification message is inserted into a wireless application protocol push message and the wireless application protocol push message is inserted into a short message configured as a short message service message and the telecommunication device is connected to a short message service center, which sends the short message to the telecommunication device on the instruction of the multimedia message service center.

22. The telecommunication device according to claim 18, wherein the central control device is connected via the collection device to a dial-in node, via which the multimedia message service center or the storage unit assigned to the multimedia message service center is accessed according to the dial-in information.

23. The telecommunication device according to claim 18, wherein the central control device is connected via the collection unit and via a telecommunication connection or via an Internet connection according to the TCP/IP protocol to the multimedia message service center or the storage unit assigned to the multimedia message service center, via which access takes place.

24. The telecommunication device according to claim 18, wherein the telecommunication device is a fixed network or mobile network device, in particular a cordless mobile unit.

25. The telecommunication device according to claim 18, wherein the multimedia message has audio, video and/or text data.

26. A telecommunication device for accessing multimedia messages stored in at least one storage unit of a multimedia message service center, comprising:
- a central control device for controlling the operational and functional processes in the telecommunication device; a collection device for collecting messages and/or information, which is connected to the central control device;
- a receiver for receiving a notification message sent directly or indirectly from the multimedia message service center to the telecommunication device, which is connected to the central control device and forwards the notification message to the central control device to inform the telecommunication device of a multimedia message stored in the multimedia message service center for the telecommunication device;
- identification means assigned to the central control device which is configured such that dial-in information received by the receiver in addition to the notification message and forwarded to the central control device is identified, informing the telecommunication device where it must dial in to, in order to be able to access the stored multimedia message, wherein the collection device and the central control device with the assigned identification means are configured such that the central control device accesses the multimedia message service center or the storage unit assigned to the multimedia message service center via the collection device using the dial-in information, to collect the multimedia message and
- verification means assigned to the central control device that is configured to form a functional unit with the identification means such that after identification of the dial-in information sent by the multimedia message service center and received by the receiver, the dial-in information is verified, before access by the central control device takes place as a function of this verification.

27. The telecommunication device according to claim 26, wherein a keyboard, electro-acoustic converter and display device assigned to the central control device are present, which form a functional unit with the central control device and the verification means, said functional unit being configured such that verification of the dial-in information takes place in dialog with the user of the telecommunication device such that the dial-in information is displayed acoustically or visually to the user and said user must then confirm the displayed dial-in information, before access by the central control device takes place.

28. A telecommunication device for accessing multimedia messages stored in at least one storage unit of a multimedia message service center, comprising:
- a central control device for controlling the operational and functional processes in the telecommunication device; a collection device for collecting messages and/or information, which is connected to the central control device;
- a receiver for receiving a notification message sent directly or indirectly from the multimedia message service center to the telecommunication device, which is connected to the central control device and forwards the notification message to the central control device to inform the telecommunication device of a multimedia message stored in the multimedia message service center for the telecommunication device;
- identification means assigned to the central control device which is configured such that dial-in information received by the receiver in addition to the notification message and forwarded to the central control device is identified, informing the telecommunication device where it must dial in to, in order to be able to access the stored multimedia message, wherein the collection
- device and the central control device with the assigned identification means are configured such that the central control device accesses the multimedia message service center or the storage unit assigned to the multimedia message service center via the collection device using the dial-in information, to collect the multimedia message, and
- a storage device assigned to the central control device which forms a functional unit with the verification means, said functional unit being configured such that verification of the dial-in information takes place automatically based on an exclusion list with excluded dial-in information stored in the storage device, an authorization list with authorized dial-in information stored in the storage device or a special list with generally applicable rules for permitted dial-in information stored in the storage device.

* * * * *